Jan. 31, 1967 G. R. SHERMAN 3,302,000
DOMESTIC OVEN WITH MOVABLE WALL PANELS
Filed Dec. 20, 1963
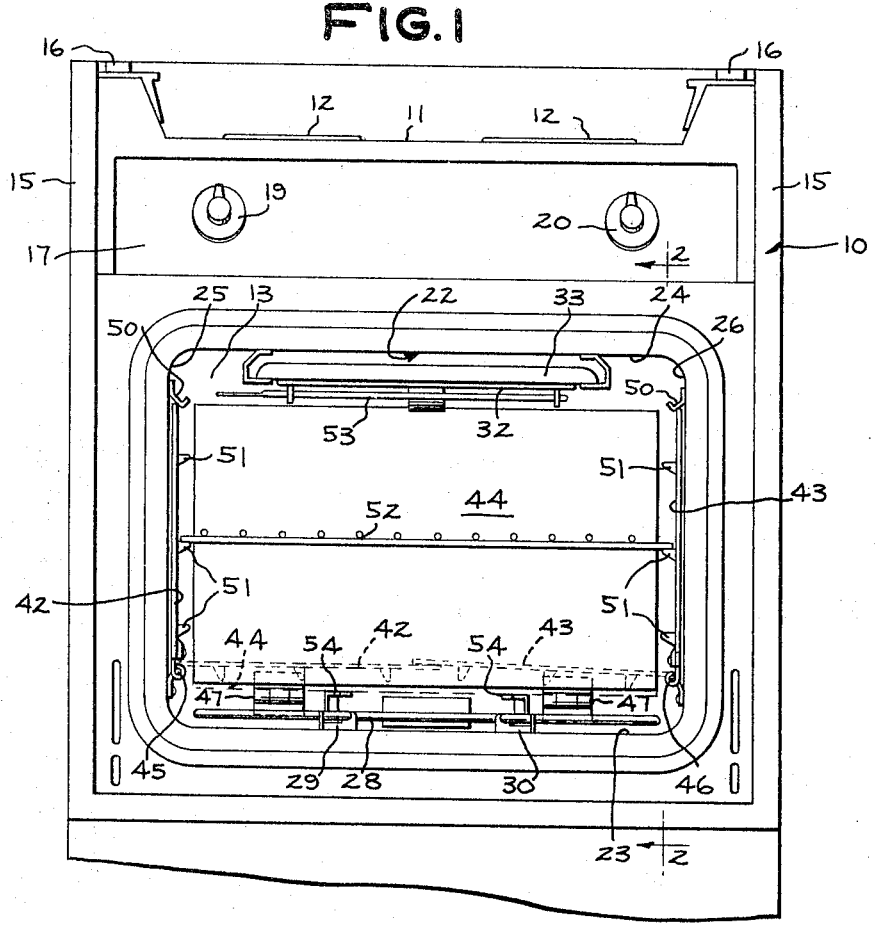
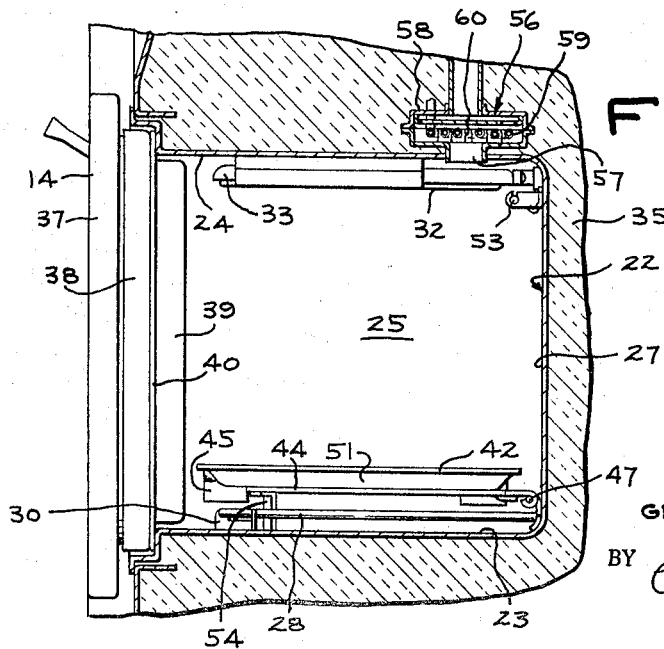
INVENTOR.
GEORGE R. SHERMAN
BY Richard L. Caslin
HIS ATTORNEY

United States Patent Office 3,302,000
Patented Jan. 31, 1967

3,302,000
DOMESTIC OVEN WITH MOVABLE WALL PANELS
George R. Sherman, Louisville, Ky., assignor to General Electric Company, a corporation of New York
Filed Dec. 20, 1963, Ser. No. 332,176
4 Claims. (Cl. 219—393)

The present invention relates to domestic ovens and particularly to a design of oven with movable wall panels that are positioned over certain walls of the oven liner forming the oven cavity for catching the food drippings and grease spatterings that might occur during a normal cooking operation. Moreover, this invention encompasses means within the oven for cleaning the food soil from these movable panels by the action of pyrolysis which causes a chemical decomposition of the soil into gaseous products and finally creates a small amount of loose ashes that forms in the bottom of the oven under conditions of heavy loads of food soil.

Probably the major annoyance to the housewife in using an oven is the difficulty encountered in keeping clean the walls forming the oven cavity. During the normal cooking operations food particles and grease spatterings often lodge on the hot oven surfaces where they are partially baked on, so that they not only discolor to a burnt appearance, but what is far more objectionable, they adhere tenaciously to the surfaces. Strong chemical cleaning agents have been devised for application to the oven walls for loosening the food soil so that by scraping and scrubbing the soil may be removed. Another aid has been oven designs with easily removable oven doors so as to render the soiled oven walls more accessible for cleaning. Other approaches have been the use of sheets of aluminum foil covering the walls of the oven liner, removable metal panels coated with a high temperature plastic finish where the panels can be removed from the oven and cleaned in the kitchen sink, as well as a slide-out oven liner with a large opening in the top wall for ease in locating and reaching the food soil for applying a scrubbing action.

A more positive and less laborious answer for solving this cleaning chore has been the recent introduction of a special oven design with a high temperature heat-cleaning cycle as is described and claimed in the copending patent of Bohdan Hurko, No. 3,121,158 which issued on February 11, 1964, and is assigned to the General Electric Company, the assignee of the present invention. In such an oven, the temperature is allowed to rise above the normal cooking temperatures of between about 150° F. and 550° F. to a heat-cleaning temperature range extending between about 750° F. and about 950° F. At these elevated temperatures the food soil will be decomposed or degraded and the corresponding gaseous degradation products are first passed through an oxidation unit and finally exhausted to the exterior of the oven cavity so as to prevent a subsequent condensation of the soil upon the interior surfaces of the oven liner as well as to avoid returning soot and obnoxious gases to the kitchen atmosphere. Such an oven design as is taught by Hurko envisions an oven that is completely redesigned from a standard baking oven so as to derive the maximum benefits of the self-cleaning oven principle. The present invention is concerned with simple modifications of the design of a standard baking oven to obtain comparable cleaning results by installing movable panels covering at least the two side walls and the back wall of the oven liner, and making it possible to clean these panels as well as the bottom wall of the oven liner by the action of pyrolysis while they are all within the oven cavity. This is all without completely redesigning the oven, its insulating system, the oven mounting means and the temperature control system.

The principal object of the present invention is to provide a domestic oven with shielding panels to prevent certain walls of the oven liner from becoming soiled by food and grease as well as to facilitate the ease of cleaning these panels within the oven by the action of pyrolysis.

A further object of the present invention is to provide a domestic oven of the class described where the movable panels may be relocated within the oven to form an enclosure over one of the heating means of the oven so as to shield the temperature sensor of the oven thermostat and be able to raise the temperature of the panels to a heat-cleaning temperature without a comparable rise in temperature of the sensor and adjacent parts of the oven structure.

A still further object of the present invention is to provide a domestic oven with a plurality of heating means and a plurality of removable panels covering certain of the walls of the oven liner so that the panels may be relocated to cover at least one of the heating means and in close proximity thereto, thereby forming a small enclosure around the heating means to accomplish a pyrolytic reaction on the panels without overheating the other parts of the oven structure.

The present invention, in accordance with one form thereof, is embodied in a domestic oven having an insulated oven liner and an access door to form an oven cooking cavity. The oven includes at least one heating means located adjacent one wall thereof, and several movable panels for covering the two opposite side walls as well as the back wall of the oven liner. These panels serve to protect the underlying walls of the oven liner from becoming soiled by food drippings and grease spatter. Means are provided for rearranging the movable panels within the oven cavity to form a compact enclosure over the heating means so that when the heating means is activated, the temperature of the panels will rise above the normal cooking temperatures into a heat-cleaning temperature range between about 750° F. and about 950° F. whereby the food soil will be chemically decomposed into gaseous and ash products without, at the same time, over-heating the remainder of the oven.

My invention will be better understood from the following description taken in conjunction with the accompanying drawing and its scope will be pointed out in the appended claims.

FIGURE 1 is a front elevational view of a free-standing range having a lower oven embodying the present invention with the oven door removed for simplicity of illustration; and FIGURE 2 is a fragmentary right side cross-sectional elevational view taken on the line 2—2 of FIGURE 1 and showing the movable side and back panels relocated into close relationship with the lower heating means or bake unit of the oven in a manner following the teachings of the present invention.

Turning now to a consideration of the drawings and in particular to FIGURE 1 there is shown for illustrative purposes a free-standing electric range having a range body or cabinet structure 10 with a top cooking surface 11 supporting a plurality of surface heating elements 12, an oven cavity 13 located beneath the cooktop, and a front-opening drop-door 14 for the oven. Of course, it will be recognized that this invention is related to a baking oven per se and that the oven need not be combined in a complete range design having surface heating units in order to enjoy the advantages thereof. Moreover, the invention is equally valuable in gas as well as in electric ovens. The selector switches for the surface units 12 are located in the two side arms 15 of the range as, for example, elements 16 in the form of multiple pushbutton switches, although equivalent structures could be used such as rotary switches and the like. The controls for the oven are located in an inclined panel 17 at the front of the range between the cooktop 11 and the oven cavity 13. These controls include an oven selector switch 19 and an oven thermostat 20 as is common in this art. The oven cavity 13 is formed by an enameled oven liner 22 of box-like construction that has an open front that is adapted to be closed by the access door 14 mentioned previously. For example, the oven liner 22 has a bottom wall 23, a top wall 24, opposite side walls 25 and 26 and a back wall 27.

As in most standard electric ovens, there is a lower heating element or bake unit 28 in the form of a looped metal-sheathed heating element supported adjacent the bottom wall of the oven liner on small metal clips or feet such as 29 and 30. There is also an upper heating element or broil unit 32 arranged just below the top wall 24 of the oven liner 22. As is a general practice in this art, a metal reflector 33 in the form of an inverted shallow pan of aluminum or the like material overlies the broil unit to focus the majority of the energy developed thereby down toward the food placed between the bake and broil units. Both the bake unit 28 and the broil unit 32 are provided with electrical terminal means at the back portion thereof for extension through the back wall 27 of the oven liner and connection with suitable lead wires of the oven power circuit (not shown).

A blanket of thermal insulation 35 of fiberglass or the like material surrounds the oven liner 22 to prevent the waste of heat energy from the oven cavity as well as to maintain the temperatures of the outer walls of the range body below an amount which would be uncomfortable to the human touch when the heating elements are energized. Moreover, the oven door 14 is made up of thin sheet metal panels forming three main elements; namely, the outer door panel 37, an inner door panel 38 that is connected thereto, and an inner door liner 39 supported from the inner door panel 38 and adapted to protrude into the front opening of the oven liner as is best shown in FIGURE 2. A thermal insulating gasket 40 is mounted on the door as for example being sandwiched between the inner door panel 38 and the inner door liner 39, and this gasket is pressed into engagement with a front flange of the oven liner in order to substantially seal the oven cavity from the escape of smoke, odors and heat. This door is also provided with a blanket of fiberglass insulation (not shown) as is standard in this art.

The range and specifically the oven structure which has been explained in detail above represents more or less standard design practice in the electric range industry, and it has been presented for the introduction of one embodiment of the present invention. The oven liner 22 varies from a standard oven liner in one respect; namely, the opposite side walls 25 and 26 thereof are of generally flat configuration, while in a standard oven a plurality of vertically arranged embossments or ledges are usually positioned on each side wall to serve as support means for one or more oven racks at various heights within the oven cavity. The present invention includes a plurality of movable metal panels or shields 42, 43 and 44 which cover the major portions of the two side walls 25 and 26 as well as the back wall 27 of the oven liner 22, respectively. Each one of the three panels 42, 43 and 44 is provided with hinge means along the lower edges thereof such as hinge members 45, 46 and 47. Suitable clip members 50 are fastened to the oven liner walls adjacent the top edges of the panels to serve as a detent means for supporting the panels in an upright position. It will be noted that a plurality of vertically spaced embossments as ledges 51 are formed on the inner surface of each of the two side panels 42 and 43 so as to serve as a means for supporting a wire oven rack 52. This rack 52 must be removed from the oven cavity before the hinged panels 42–44 can be moved within the oven.

The drawings show a pair of metal pedestals or standards 54 arranged adjacent the front edge of the bottom wall 23 of the oven liner. These pedestals are slightly higher than the lower bake unit 28 so as to serve as support means for the back panel 44 when this panel is folded down into a generally horizontal position overlying the bake unit 28. After the back panel 44 is moved into this folded position, the two side panels 42 and 43 are then lowered into a position overlying the back panel and slightly overlapping each other at the center of the oven all as is shown in dotted lines in FIGURE 1. The rack-supporting embossments 51 of the two side panels 42 and 43 serve a secondary function of spacing these side panels 42 and 43 from the underlying back panel 44 in a nested position over the bake unit. Thus, a small enclosure is formed over the bake unit 28 by the three folded panels 42, 43 and 44, the bottom wall 23 of the oven liner and portions of the oven door 14 and the two side walls 25 and 26 of the oven liner.

As is standard in this art, a thermostat sensor 53 is located within the oven cavity from the back wall 27 adjacent the top portion thereof. This sensor is connected to the thermostat 20 by means of a cable or tube (not shown). While this thermostat may be of many different designs a suitable example of a hydraulic design is taught in the United States patent to W. J. Ettinger 2,260,014.

After the three hinged panels have been rearranged in their horizontal position overlying the lower bake unit 28, this unit is energized by arranging the proper setting of the oven selector switch 19 and the thermostat 20. For example, the thermostat is set at a maximum cooking temperature of about 550° F. The nested panels 42–44 serve to form the beforementioned enclosure over the bake unit so that the surfaces of the three hinged panels will be heated to a temperature between about 750° F. and about 950° F. for chemically decomposing the food soil lodged thereon. Thus, the heat generated by the bake unit will act upon both the panels and the bottom wall 23 of the oven liner to create a thorough cleaning action in this confined space. The remainder of the range body and oven liner will constitute a large enough heat sink so that the temperatures of these range parts should not reach excessive temperatures requiring the special oven liner mounting means and heavy insulation found in earlier designs of self-cleaning ovens. The small enclosure over the bake unit 28 serves to shield the temperature sensor 53 from the heat radiating from the bake unit 28. The best results have been obtained by setting the oven controls to baking position or perhaps a time baking position so that the bake unit 28 is energized at 3000 watts and 236 volts while the broil unit 32 in unenergized. Thus, with the thermostat 20 set at an oven temperature of 550° F., for example, the temperature within the enclosure around the bake unit 28 will rise to within the heat cleaning temperature range of about 750° F. and about 950° F.

One possible modification would be to hinge the back panel 44 adjacent its top edge rather than its bottom edge so that this back panel may be hinged upwardly into a position underlying the broil unit 32. This is known to be less satisfactory because the temperature sensor would have to be moved to one of the side walls 25 or 26 and there would be more difficulty in governing the desired cooking temperatures. This modification, however, would clean the top wall 24 while the preferred modification would not.

The proposed high temperature treatment of the food soil baked onto the inner surface of the hinged panels 42–44 degrades the soil by a process known as pyrolysis. This is accomplished without the ignition of either the food soil or the gaseous primary and secondary degradation products, whereby there is no burning of such products in the oven in the proper chemical sense of this term. However, it is important to provide a suitable oxidizing unit 56 such as a catalytic smoke eliminator to treat the generated gases and eliminate any presence of free carbon or soot and carbon monoxide gases. This unit is located above the upper wall 24 of the oven liner, and it has a lower inlet port 57 in said upper wall and an upper outlet port (not shown) that exhausts beneath one of the surface units 12 of the cooktop so that the gases are returned to the kitchen. A suitable oxidizing unit is disclosed in U.S. Patent 2,900,483 granted on August 18, 1959, to Stanley B. Welch. This unit has an outer casing 58 that houses an electric heating element 59 in spiral form and a wire screen 60 that is intermeshed therewith. This screen is coated with a catalytic material, such as, for example, platinum, that is, especially adapted to promote the oxidation of carbon and carbon products so as to eliminate smoke, carbon monoxide, vapors and other objectionable products exhausted from the oven cavity.

Modifications of this invention will occur to those skilled in this art therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. A domestic oven comprising an oven body having an insulated oven liner and an access door that forms an oven cooking cavity, heating means for said cavity including an upper electrical broil heating unit and a lower electrical bake heating unit, a thermostatic control system for the oven including a temperature sensor positioned within the oven cavity, the oven liner being of box-like shape with a bottom wall, opposite side walls, a back wall, a top wall and an open front that is adapted to be closed by the said access door, removable panels covering the two side walls and the back wall so that the panels will protect the underlying surfaces of the oven liner from being soiled by food drippings and grease spatterings, and pyrolytic means for cleaning the food soil from the panels as well as from the bottom wall of the oven liner, said pyrolytic means comprising the formation of an enclosure over the lower bake unit by lowering the panels into close proximity therewith so as to shield the bake unit from the temperature sensor, whereby when the bake unit is energized, the temperature of the panels and the bottom wall will rise above the normal cooking temperatures into a heat cleaning temperature range between about 750° F. and about 950° F., wherein the food soil will be degraded into gaseous and ash products, without elevating the temperature of the oven body until it is uncomfortable and unsafe to the human touch.

2. A domestic oven comprising an oven body having an insulated oven liner and an access door that forms an oven cooking cavity, heating means for said cavity including an upper broil heating unit and a lower bake heating unit, a thermostatic control system for the oven including a temperature sensor positioned within the oven cavity, the oven liner being of box-like shape with a bottom wall, opposite side walls, a back wall, a top wall and an open front that is adapted to be closed by the said access door, the said side walls being relatively flat in configuration, removable metal panels covering the two side walls and the back wall so that the panels will protect the underlying surfaces of the oven liner from being soiled by food drippings and grease spatterings, and pyrolytic means for cleaning the food soil from the panel as well as from the bottom wall of the oven liner, said pyrolytic means comprising the formation of an enclosure over the lower bake unit by pivoting the back panel down over the bake unit and then pivoting the two side panels down over the back panel so as to shield the bake unit from the temperature sensor, the inner faces of the two side panels having shelf-supporting protrusions, and a shelf member suspended from the side panels on the protrusions, said protrusions serving to space the side panels from the back panels when said panels form an enclosure over the bake unit, whereby when the bake unit is energized the temperature of the panels and the bottom wall of the oven liner will rise above the normal cooking temperatures into the heat cleaning temperature range between about 750° F. and about 950° F. wherein the food soil will be chemically decomposed into gaseous and ash products.

3. A cooking apparatus comprising walls forming an oven cavity, one wall of the cavity including a door for gaining access thereto, lower heating means for the cavity for supplying heat for cooking foods placed therein, a thermostatic control system for the oven including a temperature sensor positioned within the oven cavity adjacent the top portion thereof, and pyrolytic means for cleaning the food soil that becomes deposited on the walls forming the oven cavity during normal cooking, said pyrolytic means including removable panels covering the two side walls and the back wall of the walls forming the oven cavity so that the panels will protect the underlying walls from being soiled by food drippings and grease spatter, said pyrolytic means further comprising the use of the removable panels in combination with a bottom wall in making a box-like enclosure around the lower heating means by moving the panels into close proximity with the heating means so as to shield the temperature sensor from the lower heating means whereby when the heating means is energized, the temperature of the panels and the bottom wall forming the said enclosure will rise above the normal cooking temperatures into a heat cleaning temperature range between about 750° F. and about 950° F. for a sufficient amount of time so that the food soil on the surfaces of the enclosure will be degraded into gaseous products and removed therefrom.

4. The cooking apparatus as recited in claim 3 wherein the two side panels are provided with a series of spaced ledges on the inner surfaces thereof that are adapted to support oven racks therefrom, so that during a pyrolytic cycle the back panel is located immediately adjacent the lower heating means and the two side panels are nested on top of the back panel but spaced therefrom by means of the spaced ledges which serve as spacers to hold the side panels away from the back wall panel.

References Cited by the Examiner

UNITED STATES PATENTS

| 1,843,486 | 2/1932 | Kahn et al. | 126—39 |
| 2,222,065 | 11/1940 | Blakeslee | 219—396 X |
| 2,746,448 | 5/1956 | Holmsten | 126—19 |
| 2,841,132 | 7/1958 | Philipp | 126—19 |

RICHARD M. WOOD, *Primary Examiner.*

C. L. ALBRITTON, *Assistant Examiner.*